No. 796,612. PATENTED AUG. 8, 1905.
F. SPALDING.
SCREW GAGE.
APPLICATION FILED DEC. 1, 1904.
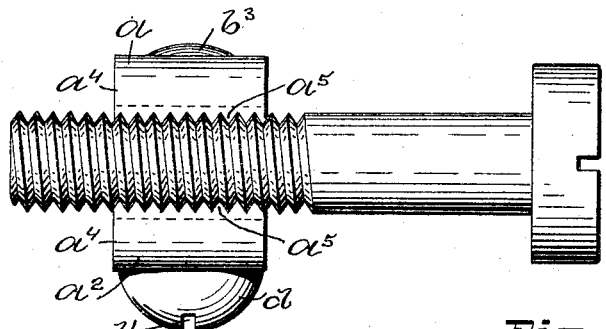
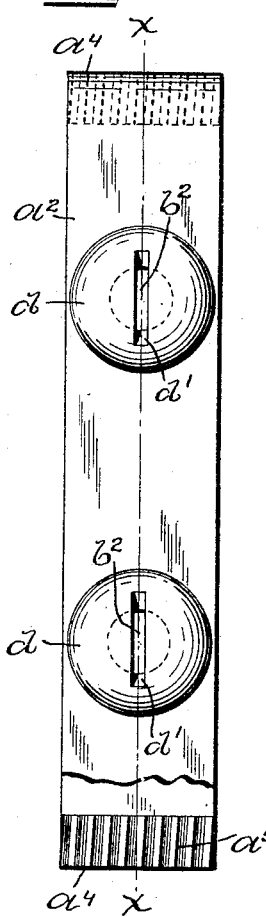
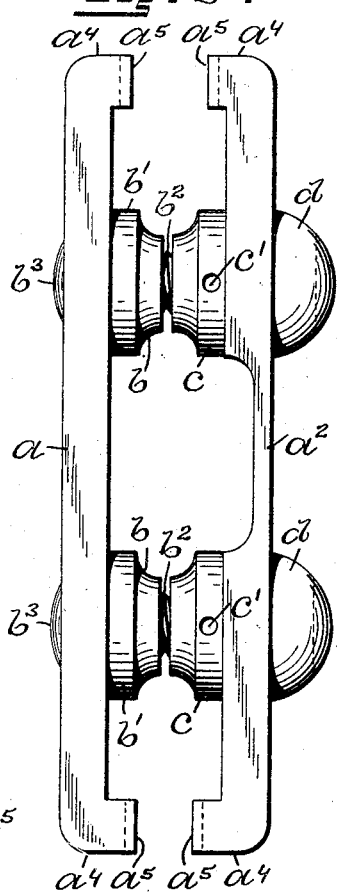
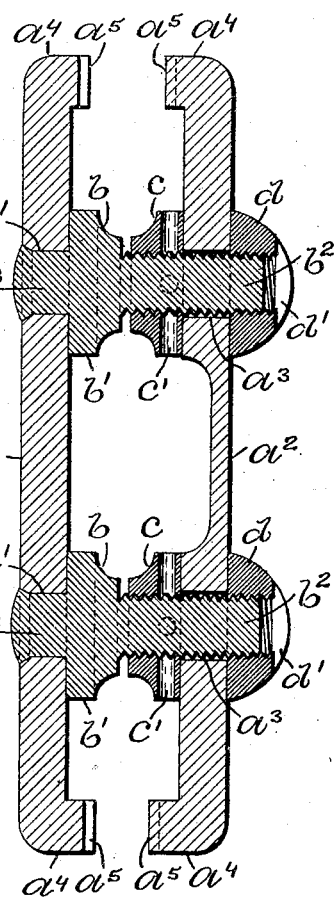
WITNESSES:
Chas. W. Luther Jr.
Ada E. Hagerty
INVENTOR:
Frank Spalding
by Joseph H. Miller & Co.
ATTORNEYS

UNITED STATES PATENT OFFICE.

FRANK SPALDING, OF PROVIDENCE, RHODE ISLAND, ASSIGNOR TO BROWN & SHARPE MANUFACTURING COMPANY, OF PROVIDENCE, RHODE ISLAND.

SCREW-GAGE.

No. 796,612.   Specification of Letters Patent.   Patented Aug. 8, 1905.

Application filed December 1, 1904. Serial No. 235,034.

*To all whom it may concern:*

Be it known that I, FRANK SPALDING, a citizen of the United States, residing at Providence, in the county of Providence and State of Rhode Island, have invented a new and useful Improvement in Screw-Gages, of which the following is a specification.

This invention has reference to an improvement in screw-gages used by machinists to accurately gage the screw threads or bolts.

Screw-gages as heretofore manufactured were constructed in one piece or of several pieces rigidly secured together. Such gages will wear in use, thereby making the gage inaccurate and ruining the utility of the gage.

The object of my invention is to produce a screw-gage with means for adjusting the gage for wear, and I accomplish this object by constructing a screw-gage having jaws between which a screw is gaged, with means for accurately adjusting the relative position of the jaws and to firmly hold the jaws in the adjusted position.

My invention consists in the peculiar and novel construction of a screw-gage consisting of two parallel bars the ends of which are bent inwardly to form oppositely-disposed jaws on the face of which are teeth adapted to gage a screw, studs rigidly secured to one of the bars, each stud having a screw-threaded stem extending through a hole in the opposite or movable bar, a screw-threaded collar on the stem bearing on the inner face of the movable bar, and a nut on the stem bearing on the outer face of the bar, whereby the bar is adjusted on the studs and the jaws adjusted relatively for wear, as will be more fully set forth hereinafter.

Figure 1 is an enlarged end view of my improved screw-gage, showing a screw in the gage to illustrate the application of the device. Fig. 2 is a face view of the gage, showing one of the jaws broken away to clearly show the teeth on the inner face of the opposite jaw. Fig. 3 is a side view of the gage, showing the jaws at each end of the gage spaced for gaging screws of different diameters; and Fig. 4 is a sectional view taken on line X X of Fig. 2, showing the means for adjusting the gage for wear.

In the drawings, $a$ and $a^2$ indicate two flat parallel bars. The bar $a$ has the transverse holes $a'$ $a'$, and the movable bar $a^2$ has the transverse holes $a^3$ $a^3$. Each bar has inwardly-bent L-shaped ends forming the jaws $a^4$ $a^4$, on the face of which are the V-shaped teeth $a^5$ $a^5$, as shown in Fig. 1. These teeth extend from the outer to the inner edge of the jaws at a predetermined angle and pitch corresponding to the diameter and pitch of the screw to be gaged.

The studs $b$ $b$ each have a circular flange $b'$, a screw-threaded stem $b^2$, extending through the holes $a^3$ $a^3$ in the bar $a^2$, and a shank $b^3$ for securing the studs to the bar $a$ through the holes $a'$ $a'$ by upsetting the ends of the shanks in the holes, as shown in Fig. 4.

The collars $c$ $c$ have the radial holes $c'$ $c'$ for adjusting the collar. These collars are in screw-thread engagement with the stems $b^2$ $b^2$ and bear on the inner face of the movable bar $a^2$.

The nuts $d$ $d$ are in screw-thread engagement with the ends of the stems $b^2$ $b^2$. They bear on the outer face of the movable bar $a^2$ and have the slots $d'$ $d'$ for turning the nuts to loosen or tighten the same.

In the use of my improved screw-gage a screw is gaged by holding the screw at right angles to the gage and passing the threaded part of the shank between the jaws $a^4$ $a^4$, as shown in Fig. 1. The continued passing of screws through the jaws of the gage wears the teeth $a^5$ $a^5$ on the face of the jaws. To compensate for this wear, the jaws are adjusted from time to time to a master-screw by loosening the nuts $d$ $d$, turning the collars $c$ $c$ to the right by inserting a key in the holes $c'$ $c'$, and tightening the nuts $d$ $d$, thus keeping the gage in an absolute accurate condition and increasing the value and utility of the gage.

It is evident that the teeth $a^5$ $a^5$ could be of any shape corresponding to the different kinds of screw-threads and that any means could be used for adjusting the jaws $a^4$ $a^4$ without materially affecting the spirit of my invention.

Having thus described my invention, I claim as new and desire to secure by Letters Patent—

1. A screw-gage having two parallel bars the ends of which are bent inwardly to form oppositely-disposed jaws, teeth on the face of the jaws extending at an angle from the outer to the inner edge of the jaws, and means for relatively adjusting the jaws for wear, as described.

2. A screw-gage having two parallel bars the ends of which are bent inwardly to form oppositely-disposed jaws, teeth on the face of the jaws extending at an angle from the outer to the inner edge of the jaws, studs firmly secured to one of the bars, screw-threaded stems on the studs extending through holes in the movable bar, collars in screw-thread engagement with the stems and bearing on the inner face of the movable bar and nuts on the stems bearing on the outer face of the movable bar, as described.

3. In a screw-gage, the combination of the bar $a$ having the holes $a'$ $a'$, the jaws $a^4$ $a^4$ and the teeth $a^5$ $a^5$, the bar $a^2$ having the holes $a^3$ $a^3$, the jaws $a^4$ $a^4$, and the teeth $a^5$ $a^5$, the studs $b$ $b$ having the flanges $b'$ $b'$, the screw-stems $b^2$, $b^2$, and the shank $b^3$ $b^3$, the collars $c$ $c$ in screw-thread engagement with the stems $b^2$ $b^2$ and having the radial holes $c'$ $c'$, the nuts $d$ $d$ on the stems $b^2$ $b^2$ and having the slots $d'$ $d'$, as described.

In testimony whereof I have signed my name to this specification in the presence of two subscribing witnesses.

FRANK SPALDING.

Witnesses:
ADA E. HAGERTY,
J. A. MILLER, Jr.